United States Patent [19]

Moreno et al.

[11] 4,170,098
[45] Oct. 9, 1979

[54] APPARATUS FOR HARVESTING SUGAR CANE

[76] Inventors: Miguel A. P. Moreno, Calle Juan Delgado 710, Vibora; Jorge A. Cil, Calle 19 No. 455, Vedado; Justo B. Montero, Calle San Mariano No. 265, c/armas y porvenir; Guillermo B. Novais, 18415, 15 St. Stgo. de las Vegas; José A. R. Morales, 309, O St., Apt. 8, Marianao; Fernando C. Montalvo, 6, Manrique St., Apt. 5, all of Havana; Armando A. Rivero, 189, 5a, St., Rpto. Alkazar, Arroyo Naranjo; Mario J. M. Castro, 2320, 80 St., Marianao; Jacinto F. Suarez, 364, Manila St., Cerro, both of Havana, all of Cuba

[21] Appl. No.: 821,281

[22] Filed: Aug. 2, 1977

[51] Int. Cl.² .................. A01D 45/10; A01D 55/18; A01D 57/22; A01D 45/02

[52] U.S. Cl. .................. 56/13.9; 56/13.4; 56/16.6; 56/17.2

[58] Field of Search ............ 56/13.3, 13.4, 13.9, 56/17.2, 503, 12.7, 16.6; 302/37; 248/21; 209/107, 233, 289; 98/121 A

[56] References Cited

U.S. PATENT DOCUMENTS

| | | | |
|---|---|---|---|
| 2,069,728 | 2/1937 | Sperry | 98/121 A |
| 2,239,913 | 4/1941 | Hall | 302/37 |
| 3,263,360 | 8/1966 | Patterson | 302/37 |
| 3,509,742 | 5/1970 | Bauer | 248/21 |
| 3,556,327 | 1/1971 | Garrison | 56/344 |
| 3,638,405 | 2/1972 | Ferguson | 56/17.2 |
| 3,673,774 | 7/1972 | Mizzi | 56/13.3 |
| 3,680,291 | 8/1972 | Soferopulos | 56/16.6 |
| 3,690,047 | 9/1972 | Thoen et al. | 56/13.3 |
| 3,790,094 | 2/1974 | Spicer | 56/13.3 |
| 3,817,462 | 6/1974 | Hamlin | 56/13.2 |
| 3,840,134 | 10/1974 | Luscombie | 56/16.6 |
| 3,854,585 | 12/1974 | Herkes | 209/12 |
| 3,870,627 | 3/1975 | Herkes | 209/233 |
| 3,883,101 | 5/1975 | Vernier | 248/21 |
| 3,925,199 | 12/1975 | Quick | 56/13.3 |
| 3,950,924 | 4/1976 | Quick | 56/13.9 |
| 3,995,520 | 12/1976 | Spargo | 56/13.9 |
| 4,035,996 | 7/1972 | Fernandez et al. | 56/13.9 |
| 4,056,048 | 11/1977 | Milroy | 98/121 A |
| 4,065,912 | 1/1978 | Quick | 56/13.9 |

*Primary Examiner*—Russell R. Kinsey
*Assistant Examiner*—Paul J. Hirsch
*Attorney, Agent, or Firm*—Haseltine, Lake & Waters

[57] ABSTRACT

An apparatus employing a self propelling chassis for the harvesting of sugar cane employing copying wheels for following the microrelief of the ground responsive to movement in a harvesting section of the apparatus. A crosscutting assembly employing two differently dimensioned drums with off-set blades is used to cut the cane; and an associated pneumatically operated cleaning chamber employing dispersing drums, vanes, and shutters in conjuction with specifically placed blowers, act upon foreign matter during the harvesting operation and eject same to the outside of the chamber where it is deflected to a desired location.

8 Claims, 8 Drawing Figures

APPARATUS FOR HARVESTING SUGAR CANE

BACKGROUND OF INVENTION

The present invention relates to harvesting machines. More particularly, the invention is directed to combines for mechanized harvesting of sugar cane in an efficient and economical manner.

The prior art has disclosed automated machines for the harvesting of sugar cane which include apparatus employing means for following the ground relief; cutting of frontal and lateral stalks; feeder-crosscutter for the cut cane; and impurity transporting and separating assemblies mounted on the chassis. It is also known to employ equipment which utilizes a chamber for pneumatic separation, with two conveyors arranged in cascade, where the upper one is situated under a suction duct and a lower one is located in the air flow zone of a propelling conduit for directing air current from a blower toward the chopped mass. Also known are pneumatic separation chambers which comprise a conveyor to deliver chopped stems and a propelling duct located under the conveyor. To decrease the whirling and harmful air currents, the chamber at the end zone of the conveyor is equipped with a perforated top.

Also known are crosscutting devices which divide the cut cane into chunks of a given length, which employ two pair of radial blades diametrically opposed with respect to each pair, which rotate in an opposite direction and toward the encountering mass. The blades coincide twice during each revolutions, thus crosscutting the mass of cane passing between them (see U.S. Pat. No. 3,599,404 and No. 3,659,404). There also is known crosscutting devices with blades arranged tangentially on drums, in order to increase cutting capacity.

Supporting shoes or runners for the harvesting section are disclosed in U.S. Pat. No. 3,599,404, which is used to limit the height at which the cutting device makes the lower cut.

Other cane combines known utilize the system of microrelief copying, crosscutting of the stems and the other conventional harvesting elements, but which differ from the previous ones, as regard the arrangement used in the separation of foreign matter. The cleaning chamber of these combines includes a conveyor comprising three drums transverse to the chamber which conducts the crosscut vegetable means toward a zone where a flow of air produced by an extracting blower. The blower is located with its axis of rotation perpendicular to a horizontal plane of the chamber and practically over thd drums. In turn, the lighter mass is sucked up and ejected through the body of an extractor.

Also known are devices to control the air flow which intercepts the flow and includes a guide element comprising a plurality of vanes of arcuate shape to eliminate that part of the component which produces the rotational movement of the flow provoked by the blower. In another known device, a rotating element has been incorporated over the blower, coaxially to the blower, pervious to the passing of the air and impervious to the passing of foreign matter, which, when contacted, are deflected to the hoppers, directed downwards and located at each side of the body of the blower. In another known apparatus, the vanes used to decrease the rotating movement of the air flow are located at the suction side of the blower. A looped conduit located around the upper part of the body of the blower is employed, where the walls define an annular opening to receive the foreign matter ejected by the blower, under the action of a centrifugal force.

It also has been noted, that in placing cleaning chambers by extraction on top of the unloading conveyors of some of the chambers, the axis of rotation of the blower has been slightly slanted, thus producing an almost vertical suction.

In regard to prior art cleaning chambers, there are great power consumption demands due to the large field of action of the propelling flows and the need to control proper air flow when separation of foreign matter is accomplished, throughout the length of the chamber. Furthermore, it is very difficult to stabilize the working rate of the blowers because the speed of the air needed to eject part of the foreign matter is very close to the speed needed for the pneumatic transportation of the cane chunks, which results in heavy losses of cane during the cleaning process. Another defect to these machines is that the pneumatic separation is accomplished with only one blower provoking a large hydraulic resistance and decreasing the outflow of air, which affects the quality of the cleaning. Also the possibility of obstructing the blower with consequent damage to the rotor exists.

Due to the recirculation of air producted by prior art blowers, there is a limitation in the pneumatic separation in suction flows; in part, due to the need for structure to prevent the sucked foreign matter from reaching the rotor, thus partially interfering with the air intake of the blower. Furthermore, in order to direct the propelling flow of the blower to zones where the other cleaning points are located conduits must be used, the shapes and lengths of which provoke high energy losses of the air flow. As a consequence of all this, there is the need of intensifying the volume of the flow of air. Pneumatic separation is accomplished when the air is directed to a chopped mass, however, the composition and quantity of the mass can adversely affect this with the result that it becomes difficult to stabilize air flow for the different working conditions of the harvester.

Other machines have tried to overcome the aforementioned difficulties by decreasing the dimensions of the pneumatic separation chamber and its power consumption without achieving a satisfactory result. Further disadvantages which still persist include: a reduced working capacity due to the vertical location in the chamber; the action time of the suction air flow produced by the blower over the vegetable mass is insufficient; the sudden change in the path of the foreign matter travel decrease productivity and limits its utilization in high yielding fields.

Another drawback of these cleaning chambers is the high hydraulic resistance, that is, the existence of static pressures due to chamber configuration. As a result, there is a loss of energy in dynamic pressures, that is, in velocity of the air current. This translates negatively in the efficiency of the blower, which is already affected, as regards the consumption of current. Furthermore, the prior art chambers, because of the restriction of the air flow require the introduction of movable elements, in order to guarantee the entrance of the air.

A problem which has not been resolved satisfactorily is the control of the trajectory of the foreign matter ejected by the blower in order to prevent them from falling on top of the canes which have not been harvested or on top of the transportation means which receives the clean cane for transportation to the factory. The known solutions resolve only part of the problem in some cases, by employing complex construction which however, can provoke obstruction of the blowers.

Other deficiencies which have been detected in connection with these prior art harvesting machines are that the cleaning is very sensitive to the degree of cutting of the vegetable mass harvested. During the utilization of the equipment, the crosscutting blades are worn out very rapidly and the minimum of clearances between the sharp edges of these elements reduces crosscutting effectiveness and in turn a loss of suitable cleaning. Known crosscutters, such as disclosed in U.S. Pat. Nos. 3,599,404 and 3,659,404 require constant regulation of the clearance between the sharp edges of the blades and the frequent changing of the blades. These machines are characterized also by the lack of efficiency of the copying devices of the microrelief, which, without suitable regulation of the height of the cut, necessitate very complex and robust structures for the copying members, see U.S. Pat. No. 3,599,404.

SUMMARY OF INVENTION

The principal features of the invention are directed to an automatic harvesting machine, for the crosscutting and separation of the vegetable mass and for subsequent unloading; the machine employs micro-relief copying wheels which rotate freely when in contact with the ground, while the machine moves forward and when activated by the hydraulic cylinders, the position of the harvesting section alters with respect to the ground; a crosscutting device comprising two drums of different diameters in which the blades are arranged with their inside working surfaces for the entire length of the drum, off-center with respect to the axis of rotation, this eccentricity being different for each drum; a cleaning chamber disposed relative to the assembly, employing a battery of horizontally positioned dispersing drums in staggered planes, each one rotating at suitable rotating speeds, decreasing from the first to the last. The surface of contact of the vanes being slanted with respect to the radius of the drum, and the axial blower being located with its axis of rotation at a given angle of inclination over the horizontal; the flow of air being almost horizontal suction in the longitudinal direction of the chamber.

Also within the scope of the invention is a sleeve structure fastening the rotor to the structure of the chamber, having a countercutting element mounted for the recutting of the foreign matter. On the lateral and upper walls of the chamber are a system of shutters; and in the outlet of the blower, coaxial to the blower, there is a cylinder equipped with an internal spiral, the upper end of the spiral and of the cylinder, being superimposed on the cylinder and ends tangent to the cylinders; and being displaced by sliders up to two given positions to activate the hydraulic cylinders in order to direct the stream of foreign matter. The upper end of the discharging conveyor employs another cleaning chamber with the same arrangement of the blower of the first cleaning operation.

The main object of the present invention is to overcome the defects of the prior art.

Another object of the invention is to provide an apparatus for harvesting cane, with a high level of quality as regards cleaning and low losses of cane.

Another object is to considerably decrease the dimensions of the harvesting machine without increasing the power consumption.

Other objects and advantages will be understood with respect to the accompanying specification, claims, and drawings.

IN THE DRAWINGS

PREFERRED EMBODIMENT

Figure 1:
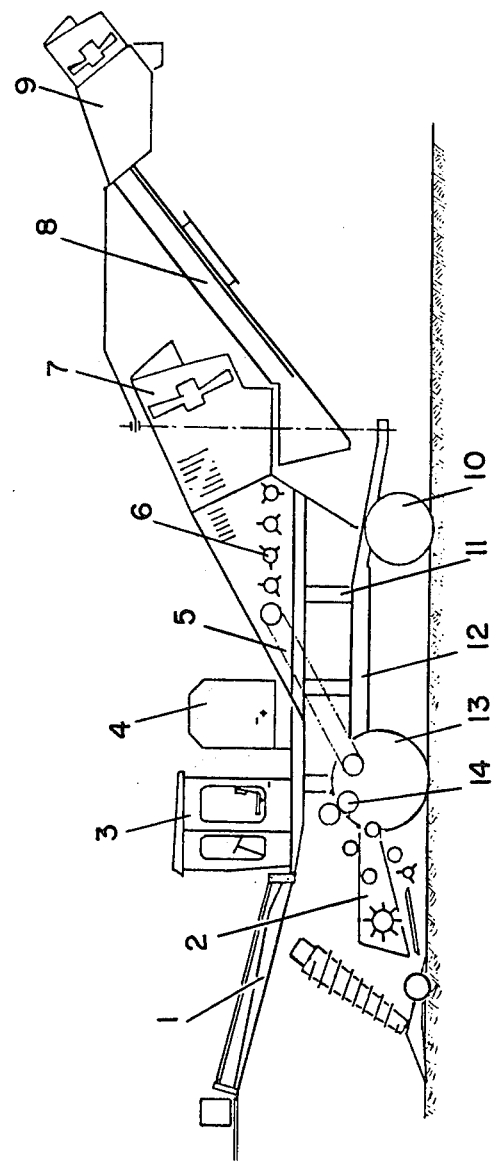
FIG. 1 illustrates a longitudinal cross section of a combined sugar cane harvester which utilizes the present invention.
Figure 2:
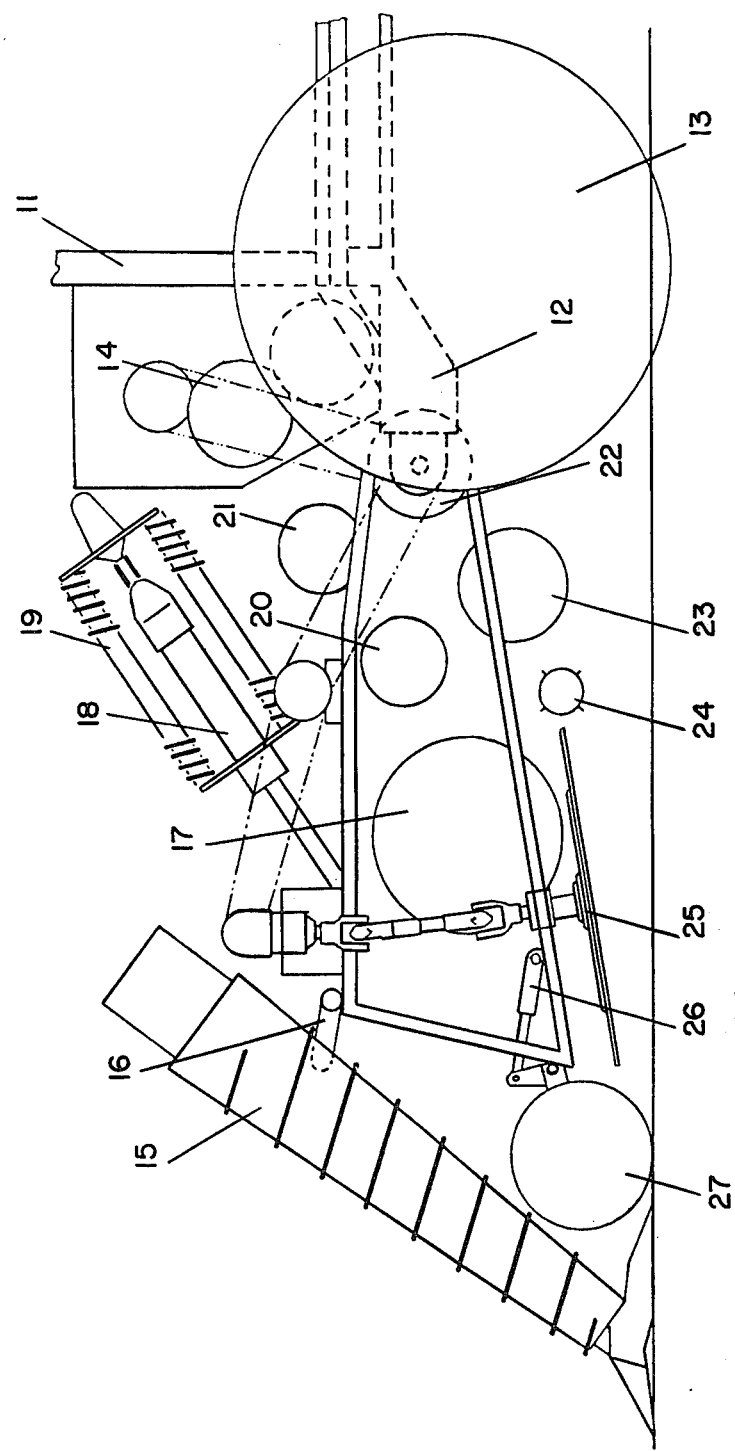
FIG. 2 is a lateral view of the harvesting section of the invention.

The inventive machine comprises an autopropulsive chassis (12) (see FIG. 1), with two front driving wheels (13) and two back steering wheels (10), plus a structure (11) screwed to the chassis (12) where all the working elements are placed, the cab (3) and the diesel motor (4). The machine comprises a sugar cane harvesting section (2) composed of active dividers with spiral surfaces (15) (see FIG. 2), on pusher (16) to slant the stems and a device for cutting the stems at their lower part (25), of the type of two disks with blades at the periphery. Very close to the cutting device (25) and in front of it and at both sides of the frontal section, there are two microrelief copying wheels (27) which rotate freely and cooperate with each other. Enough weight is placed on the wheels to secure their contact with the ground and which, activated by two hydraulic cylinders (26) interconnected in parallel and operated from the cab (3) (see FIG. 1), change the position of the harvesting section (2) only, as regards the ground. Thus the cutting of the stems at an adequate height and a complete gathering of the canes is assured, avoiding the breaking of the frontal section by digging of the dividing organs (15) and the lower cutting device (25) into the ground. The feeding device comprises three pairs of drums (17) and (24), (20) and (23), (21) and (22). The entire frontal section is suspended from the chassis (12) and the structure (11) by a set of springs (19) and hydraulic cylinders (18) in order to unload part of the weight over the chassis (12) and it pivots freely in a working position and is raised by the cylinders (18) for transportation.

Also suspended from the structure (11) (see FIG. 1) towards the front, at the center of the machine, is a shoot stripping device (1), of the type employing collecting disks, a disk with horizontal cutting elements, and a vertical drum to deflect the shoots.

Figure 3:
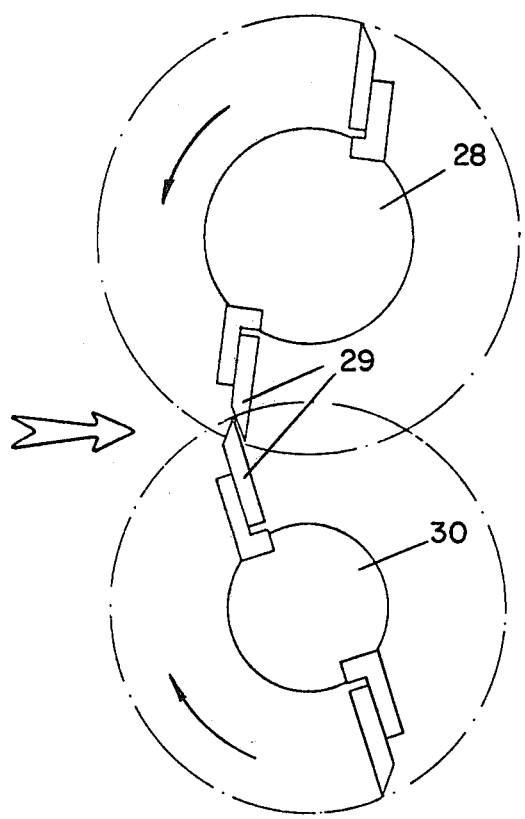
FIG. 3 is a sectional lateral view of the crosscutting device of the invention.

The device for the crosscutting of the stems (14) (see FIG. 2) is attached to the structure (11) and chassis (12) and is formed by two drums (28) and (30) (see FIG. 3) one parallel to the other and transverse to the flow of cane, for the entire width of the machine. Each on top of the other forms a convenient angle with the vertical of different outside diameters, the upper being larger and the lower being smaller. Located on each drum are two pairs of blades (29) with their sharp edges diametrically opposed for the entire length of the drum and with the inside working surface off center with respect to the rotation axis. This eccentricity being different for each one of the drums which are attached by means of screws to drum supports. The eccentric arrangement of the blades (29) guarantees that their contact with the vegetable mass takes place under the same cutting angle, making certain that both blades (29) are equally activated and that during the bigger angle of rotation of the drums (28) and (30) the smaller possible play is maintained between the sharp edges when brought face to face.

Figure 4:
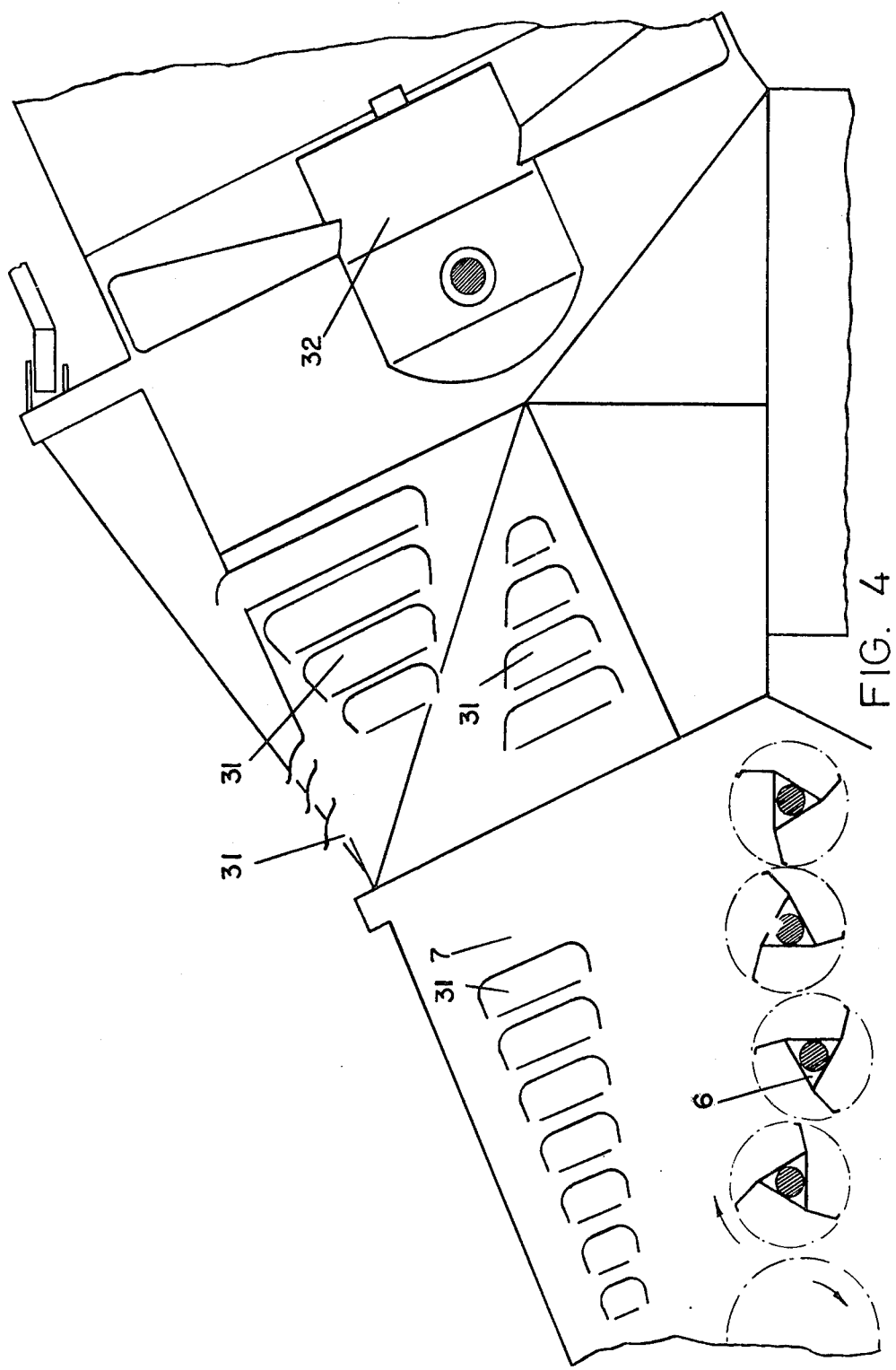
FIG. 4 is a sectional lateral view of the pneumatic cleaning chamber of the invention.
Figure 5:
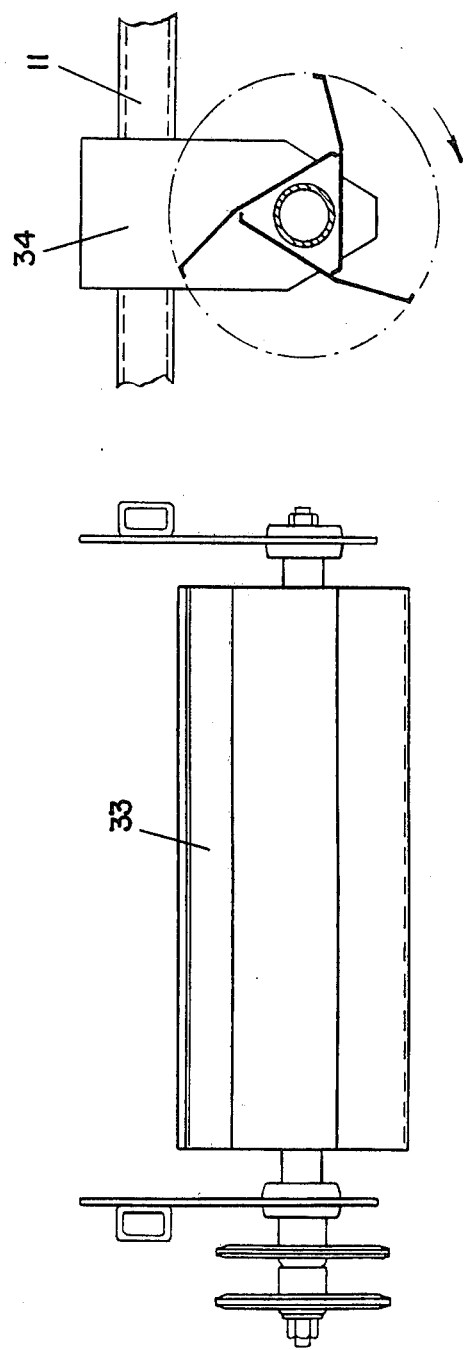
FIG. 5 is a side view of the dispersing drums of the invention.
Figure 6:
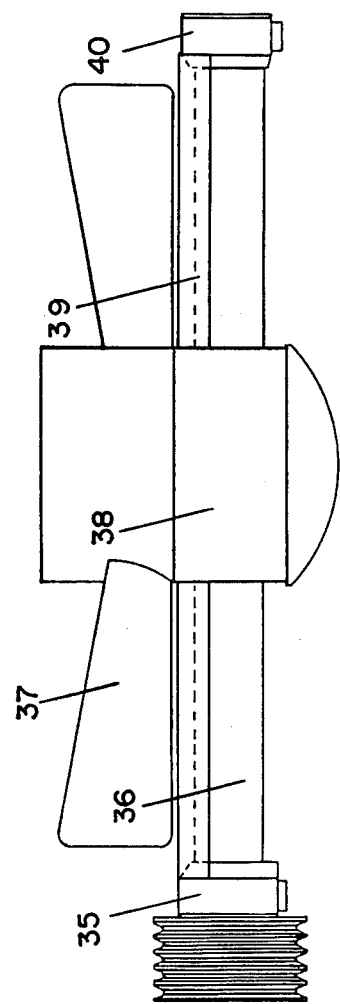
FIG. 6 is a sectional view of the sleeves and transmission of the blower of the invention.

The longitudinal conveyor (5) (see FIG. 1) of vanes and chain, is located at a convenient angle behind the crosscutter (44) for transporting the vegetable mass up to the cleaning chamber (7). This chamber (7) comprises a battery of horizontal dispersing drums (6), arranged with the axis of rotation parallel to each other and transverse to the longitudinal direction of the chamber (7) for the entire width being in turn attached to the structure (11), in staggered planes, via bearings (34) see FIG. 5). The vanes (3) are slanted in shape, at a convenient angle with respect to the radius of the drum, opposite to the rotation direction. The axial extracting blower (32) (see FIG. 4), of low pressure, is located in chamber (7) with its axis of rotation perpendicular to a transverse plane of chamber (7), in a given angle of inclination with respect to the horizontal, with its diameter bigger at the width of the dispersing drum (6), attached to the structure (11) (see FIG. 1) by the sleeves (36) (see FIG. 6) and the bearings (35), (40). The rotor (37) is attached to the outgoing axis of the bevel gear box (38). Several counter cutting elements (39) are screwed on the sleeves (36) in order to lower the current consumption during the recutting work by the rotor (37), when foreign matter passes to the interior of the body of the blower (32) (see FIG. 4). The streamlined design of the chamber (7) is complemented by a shutter system (31) located on the lateral and upper walls, in such manner that it decreases the static pressures inside and incites the blower (32) to take air through the zones where the lighter material is suspended when the vegetable mass is removed from the dispersing drums (6).

Figure 7:
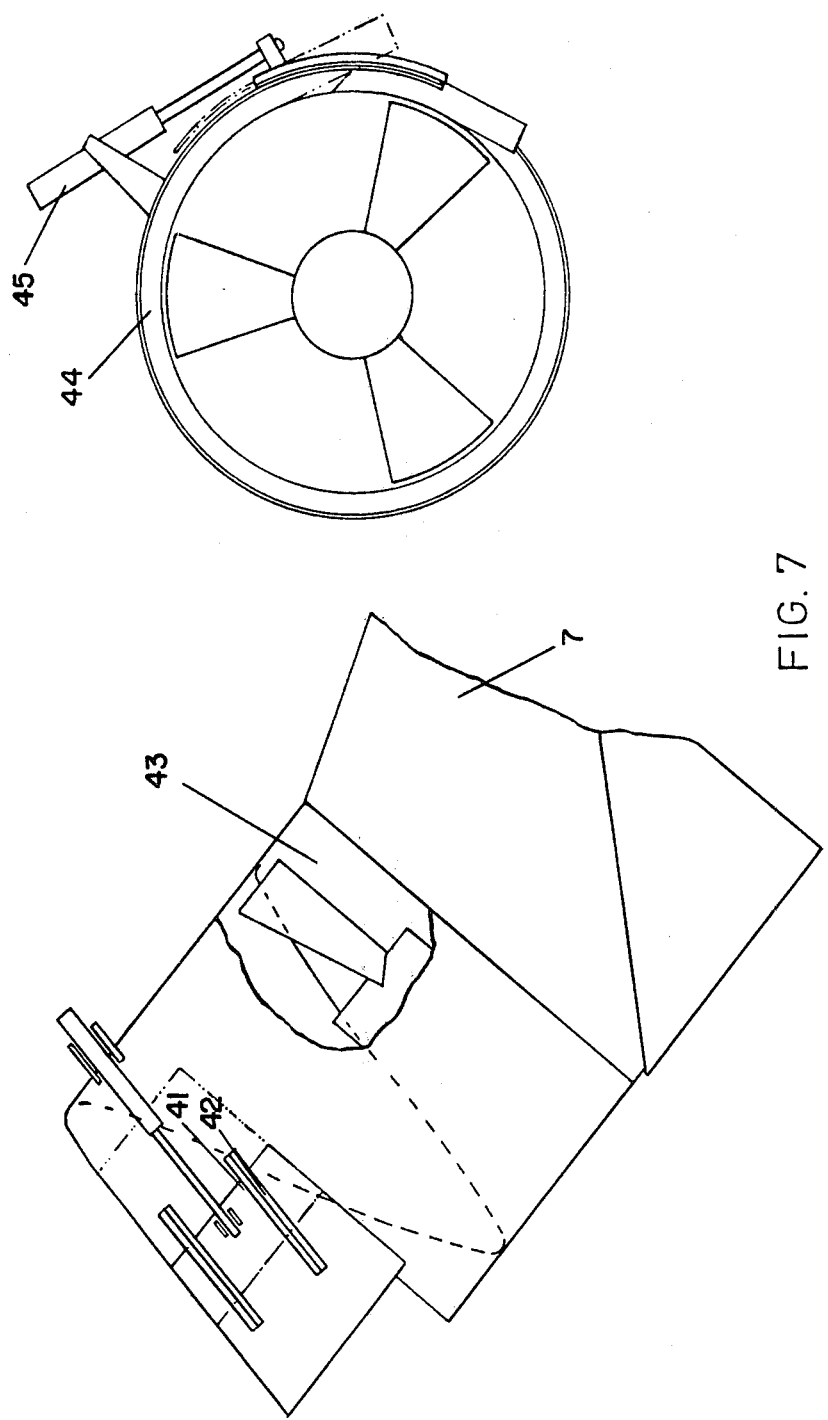
FIG. 7 is a fragmentary profile view of the deflecting structure employed in the invention.

In order to avoid the sucked foreign matter from falling over the canes which have not been harvested, cylinder (43) (see FIG. 7) is placed at the outlet of axial blower (32), coaxial with the blower, sectioned by a helically shaped plate (44) soldered on the inside, to control the movement of the air flow. The ends of the plate (44) and the body of the cylinder (43) form a supplement (41), superimposed on the cylinder (43) which ends tangential to the cylinder (43) in the direction of the ground and is displaced by guides (42) driven by a hydraulic cylinder (45) up to two given positions. If the cut is conducted to one side or to the other side of the machine, the stream of foreign matter is directed toward the furrow previously harvested, taking advantage of its own angle of inclination of the blower (32) (see FIG. 1).

Another outlet opening toward the hopper (50) of the unloading conveyor (8) is at the bottom of chamber (7), following the dispersing drums (6). This conveyor, employing vanes and chain, has at its upper end a cleaning chamber (9), in which, the axial blower (46), of low pressure, has been placed with its axis of rotation perpendicular to a transverse plane of the cleaning chamber (9), slanted in respect to the horizontal, at an angle similar to that of the first cleaning chamber (7). In harvesting fields with a high level of impurities, a dispersing drum (6) having characteristics similar to those of the drums of the first cleaning chamber (7) can be placed on chamber (9). The rear section of chamber (9) has a cover (48) which moves driven by a hydraulic cylinder in order to direct the cane toward the transportation means. The unloading conveyor (8) rotates at 180° by means of two hydraulic cylinders (52) and a chain and star rotating system (51). Rubber shock absorbers (49) are placed at the fastening and regulating screws of the hydraulic cylinder (52) in order to compensate any overload produced on the rotating device because of the heavier load to which the unloading conveyor is subjected to in this case.

In moving alongside a cane furrow, the shoots of the erect stems which are encountered are eliminated by the shoot stripping device (1) (see FIG. 1) and the dividers or splitters (15) (see FIG. 2) lift the bended canes introducing them in the receiving chamber of the frontal section, where the stems meet the pusher (16), which, exerts a force when the machine advances and places it in tension at the very moment the lower cutting device (25) makes the cut. The microrelief copying wheels (27) which are displaced by the furrow, guarantee that the cut is made at the adequate height.

The cutting device has disks (25) for producing a cutting impact and since both rotate in opposite directions, toward the inside of the machine, the cane stalks and part of the foreign matter collected by the stems are introduced into the interior of the receiving chamber, where the pairs of feeding drums (17), (24), (20), (23), (21) and (22) arrange them and proportion them for delivery to the crosscutting device (14). There, the stems are divided into chunks of a given length, when the drums (28), (30) rotate (see FIG. 3) in opposite directions and when the blades coincide twice during each revolution.

The crosscutting device (14) (see FIG. 1) hurls the vegetable mass toward the longitudinal conveyor (5) and this conveyor transports the mass, without spills, up to the cleaning chamber (7), where a battery of horizontal dispersing drums (7) because of the arrangement and the rotating speeds of each drum and shape of the vanes) suitably disperse the vegetable mass in the zone in which the extracting blower (32) (see FIG. 4) produces a flow of air, of suitable speed, at a determinable angle in favor of the movement of the mass through the length of the chamber (7). The foreign matter is suctioned away from the vegetable mass by this air current, re-cut and ejected through the body of the extractor in the form of a stream, in the direction of the furrow which has been harvested previously in response to the inclination angle of the blower (32) and the guide supplement (41) (see FIG. 7) located at the upper end of the cylinder (43).

Figure 8:
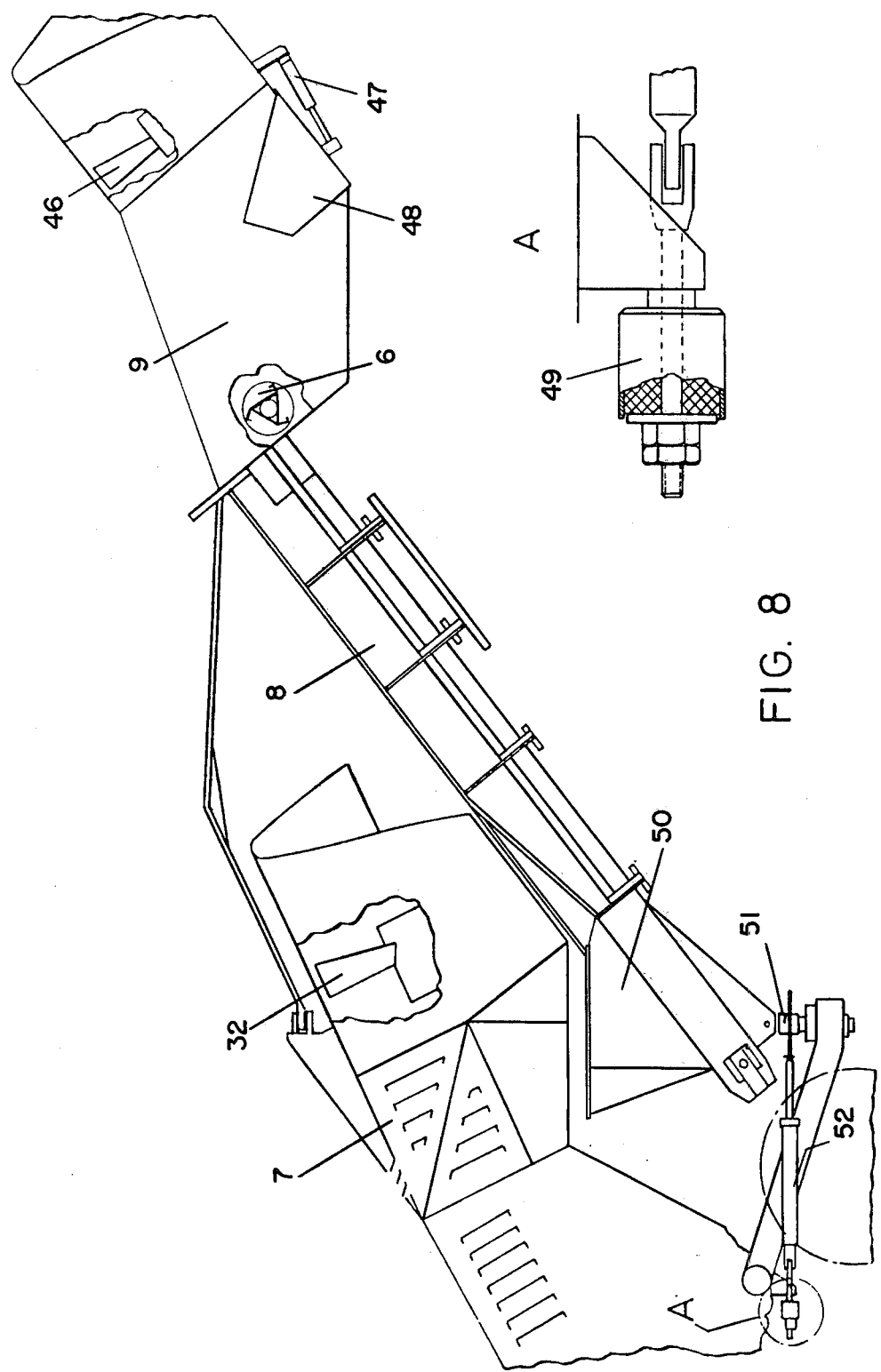
FIG. 8 is a plan view of the unloading conveyor with the pneumatic cleaning chamber and a detail of the shock absorbers of the rotating device.

The cut cane, which was submitted to the first cleaning in chamber (7) (see FIG. 8) drops into the hopper (50) of the unloading conveyor (8) to be delivered to the transportation means which moves together with the machine. At the time it drops, in going through the chamber (9), which is located at the upper end of the unloading conveyor (8), the cane is subjected to the action of another flow of air, at a suitable speed, produced by the blower (46) in order to complete the cleaning. The balance of foreign matter through a blower (46) and assisted by a spiral is ejected to the outside.

The invention eliminates the need for complementary means for the separation of foreign matter and facilitates harvesting by the mechanized cutting of the cane. The combination of the operation of the various elements benefits machine productivity, decreases the amount of foreign matter which is carried to the factory and decreases the losses of cane in the field, surpassing or exceeding the ratings of the conventional machines.

The above has been accomplished while considerably reducing the dimensions of the machine without increasing the power consumption in uplifting the operation of each element. This, of course, reduces the weight of the equipment and the cost of the materials used in the manufacturing of the machine, thus lowering the production cost.

What we claim is:

1. An improved apparatus for harvesting a vegetable mass, such as sugar cane, employing means for crosscutting and separating a vegetable mass and for unloading said mass from said apparatus, said apparatus having micro-relief surface contour copying wheels affixed thereto being freely rotatable upon contact with the ground, and said apparatus being further defined by means, in associated working relation therewith including: a frontal shoot stripper suspended from said apparatus chassis at its center; a harvesting section, pivotally mounted and suspended from said chassis; active dividers affixed to said apparatus for separating mass being conveyed on said apparatus, cutting means affixed to said apparatus for cutting lower stems of said vegetable mass, cross cutter means for cutting the stems of said mass; conveyor means for transporting the cut mass to a first cleaning chamber, said first chamber being formed of said apparatus with dispersing drums and blower means; an unloading conveyor with a pneumatic cleaning chamber to off load said mass after cleaning; wherein said improvement comprises; providing said apparatus with said crosscutting means including a crosscutting assembly attached to the chassis of said apparatus defined by two differently dimensioned rotatable drums having associated cutting blades respectively located off center with respect to the axis of rotation of said drums, and mounted in a non-tangential orientation thereto said pneumatic cleaning chamber is forward of said conveyor means formed with a battery of horizontal dispersing drums rotatable at different speeds, each having associated vanes disposed therein, said first cleaning chamber being further defined by a first axial extracting blower located at a specific angle of inclination with respect to the horizontal axis of said chamber; shutter means disposed in said chamber for drawing air therein to act upon said vegetable means being conveyed therethrough; countercutting elements disposed forward of said wheels for the hashing foreign matter of said vegetable mass and deflector means for directing said foreign matter away from the exit of the chamber; and second pneumatic cleaning chamber means formed on an unloading conveyor disposed beyond said first cleaning chamber employing a second axial extracting blower, located at an angle of inclination with respect to the horizontal axis of said second cleaning chamber, said second blowers being similar to said first blower.

2. An improved apparatus as claimed in claim 1, said improvement comprising: providing said wheels at both sides of said apparatus in front of and in proximity to cutting means in the form of disks mounted behind a front copying wheel of said apparatus for the lower cutting of the stems of said vegetable mass; and hydraulic cylinder means for operating said copying wheels to cause a change in the position of the harvesting section in relation to the ground.

3. An improved apparatus as claimed in claim 1, wherein: said crosscutting assembly being defined by drums of different diameters, having an upper one of said drums larger than the lower and being further defined by cutting blades arranged having lower working surfaces off center with respect to the axis of rotation of the respective drums, and the resultant eccentricity being different for each of said drums, such that contact with the vegetable mass is made at the same cutting angle.

4. An improved apparatus as claimed in claim 1, wherein: said cleaning chamber being provided with said dispersing drums dispersed in horizontal staggered planes, having different rotational speeds, decreasing from the first one to the last one, and having contact surfaces formed between the vanes positioned in said drums and the vegetable mass slanted with respect to the radius of the drums urged in opposite direction to rotation of said drums.

5. An improved apparatus as claimed in claim 1, wherein said axial extracting blower, of low pressure, is disposed with its axis of rotation perpendicular to a transverse section of the first cleaning chamber, and is slanted with respect to the horizontal axis of said respective chambers.

6. An improved apparatus as claimed in claim 1, wherein: said shutter means being disposed in said first cleaning chamber on its lateral and upper walls having individual elements aligned with respect to one another.

7. An improved apparatus as claimed in claim 1, wherein: said first blower uses a countercutting element attached thereto for acting upon foreign matter in combination with respective vanes disposed in said drums.

8. An improved apparatus as claimed in claim 1, wherein: supplemental guide means are formed tangential to said apparatus in the direction of the ground, said supplemental guide means being displaceable for adjustment.

* * * * *